Dec. 5, 1967 W. F. ALLER 3,355,955
POSITIONING DEVICE
Filed Oct. 4, 1965
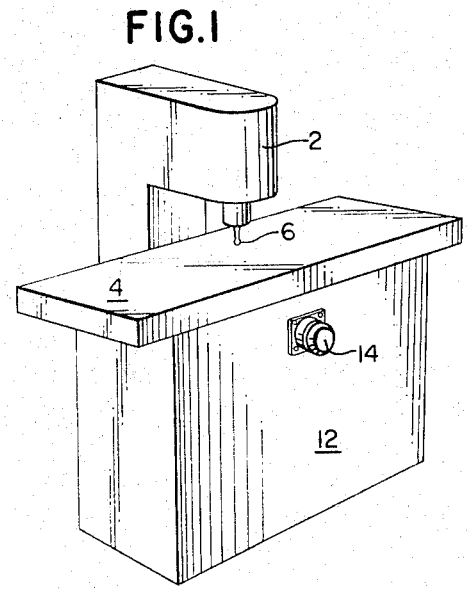
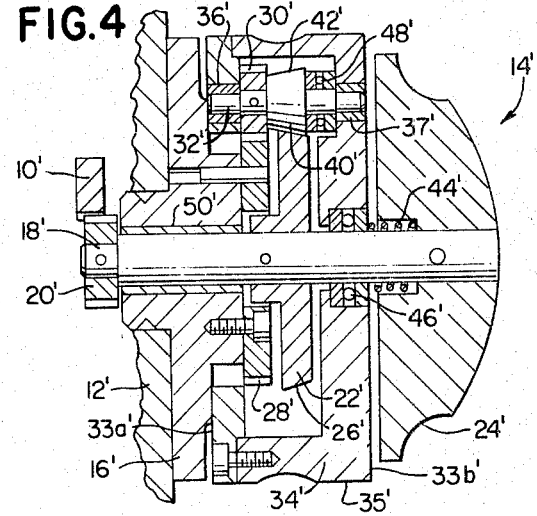
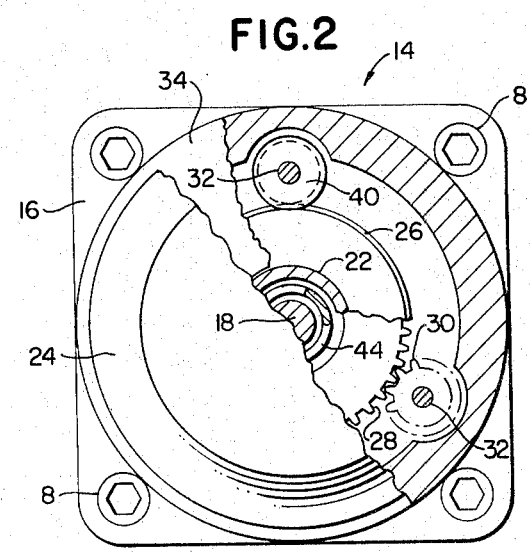
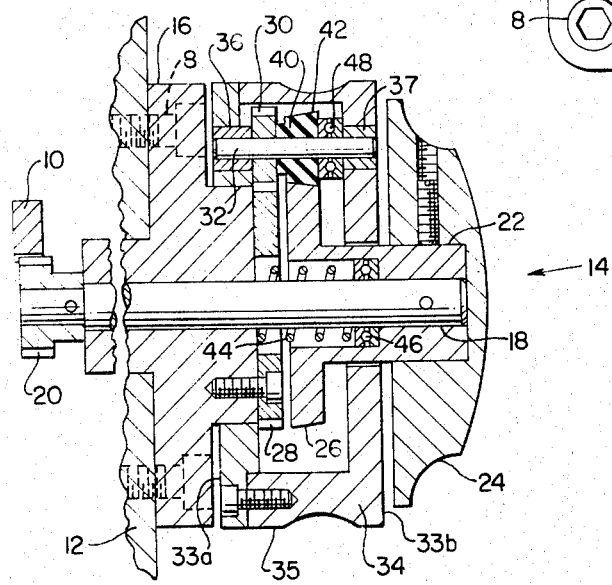
INVENTOR
WILLIS FAY ALLER
BY Ernest J. Hix
ATTORNEY

United States Patent Office 3,355,955
Patented Dec. 5, 1967

3,355,955
POSITIONING DEVICE
Willis Fay Aller, Dayton, Ohio, assignor to The Sheffield Corporation, Dayton, Ohio, a corporation of Delaware
Filed Oct. 4, 1965, Ser. No. 492,768
5 Claims. (Cl. 74—10.52)

ABSTRACT OF THE DISCLOSURE

This invention pertains to an improved precision multiple speed positioning device which is simple and economical to manufacture and assemble. The device of this invention incorporates planetary gearing and friction members to provide major reduction in positioning speed between coarse and fine feed rates. The device also provides positive breaking action during non-positioning periods. The gearing and friction elements are housed within the fine positioning knob which is coaxial with the coarse positioning knob. Axial movement of the coarse knob provides engagement and disengagement of the fine positioning friction elements.

---

This invention relates to positioning devices and more particularly to a precision positioning device for use in the machine tool and gaging industries.

In these industries there is a continuing need for precision multiple speed positioning devices that are simple to operate and have a high degree of accuracy. For instance, in precision gaging it is often desirable to move a table carrying an item to be gaged at a fast rate to a position close to a gage head and then move the table at a very slow and precise rate to precisely position the piece very close to the gage head, yet being very careful not to damage the gage head, and to hold the piece in that position. In the past, the positioning devices available have either been cumbersome and difficult to operate—or complex in construction and of high cost.

Accordingly, it is an object of this invention to provide a coarse and fine positioning device that is simple and positive in construction and operation for effective positioning and braking and relatively inexpensive to manufacture.

It is another object of this invention to provide a positioning device that is efficient and simple in operation and provides a major reduction in positioning speed between the coarse and fine feed rates.

A still further object is to provide a compact positioning device utilizing planetary gearing and friction mechanisms which also form the braking elements, wherein readily selectable coaxial coarse and fine feed means react through the same drive shaft to position an object.

Other objects and advantages of the invention will be apparent from the following description, the appended claims, and the accompanying drawings, in which, FIG. 1 is a perspective view of a gaging machine with a positioning device embodying the present invention attached thereto in an illustrative application thereof, FIG. 2 is a top view, partially in section, of an illustrative embodiment of the device, FIG. 3 is a section view of the positioning device, and FIG. 4 is a section view of a modification of the positioning device.

There is shown generally in FIG. 1 an illustrative embodiment of a gaging instrument 2 having a support 12, a worktable 4 which is movable relative to support 12 and a gaging head 6 which is used to measure objects placed on the worktable. Worktable 4 is moved relative to support 12 by rack 10 (FIG. 3) through the use of the coarse and fine positioning device 14 to be described herebelow.

The illustrated positioning device 14 in FIG. 3 has a base member 16 mounted on support 12 by a fastening means such as bolts 8. Shaft 18 extending through base 16 has a pinion gear 20 attached at one end to engage rack 10 on worktable 4 for positioning the rack and worktable relative to support 12 upon rotation of shaft 18 and gear 20. Although a rack and pinion gear are shown, any suitable configuration for converting rotary motion to linear motion may be used. A hub 22 is suitably fixed to shaft 18 so that rotation of hub 22 will cause a like rotation of shaft 18. A conical friction surface 26 fixed coaxially with shaft 18 on hub 22 is used to engage a fine adjustment means to be described. A coarse adjustment knob 24, attached to or similarly forming a part of hub 22, facilitates easier movement of the coarse adjustment means and presents a compact geometric configuration.

The fine adjustment means of positioning device 14 comprise a sun gear 28, coaxial with shaft 18, fixed to base 16. A plurality of planet gears 30 engage and revolve about sun gear 28, the planet gears being disposed on a like number of pinion pins 32 which are carried by fine adjusting knob 34 and supported by needle bearings 36–37 to reduce frictional drag. Knob 34 houses the fine adjustment means and consists of two transverse surfaces 33a and 33b, one surface being in close proximity to base 16 and the second surface being near coarse adjusting knob 24, and a surface 35 coaxial to shaft 18 extending between the base and coarse knob.

Attached to each of pinion pins 32 and mounted coaxial with the planet gears 30 are friction members 40, each having a surface 42 which, when the fine adjustment means is operative, will engage conical friction surface 26 for fine rotation of shaft 18 and thereby a fine positioning of rack 10, and table 4 in the illustrated example. The effective diameters of elements 26 and 42, 28 and 30, are such that as the fine adjustment knob 34 is rotated, a reduced rotation of shaft 18 in the same direction is obtained. It can be seen that the amount of shaft reduction for fine adjustment may be varied by changing the respective diameters of elements 26 and 42, 28 and 30.

Conical friction surface 26 and friction member surface 42 are formed with similarly inclined opposing surfaces where they mutually engage so that axial movement of knob 24 and hub 22 towards the base 16 will separate surfaces 26 and 42 and the fine adjustment mechanism will be inoperative with respect to shaft 18. Axial movement of knob 24 away from base 16 will cause surface 26 to engage surface 42, thereby rendering the fine adjustment mechanism operative upon conical friction surface 26 for fine positioning of rack 10. Spring 44 continuously urges hub 22 and hence surface 26 away from the base and into engagement with the friction members 40 of the fine adjusting mechanism to render it effective.

Thrust bearings 46 and 48 are used respectively to reduce friction of hub 22 against spring 44 and friction member 40 against the inside surface of knob 34 as the respective elements are rotated.

A modification of the positioning device is shown in FIG. 4 in which similar elements are numbered the same as in FIG. 3 with prime additions and function similarly as described in FIG. 3. Hub 22', while still suitably fixed to shaft 18' has been changed to be completely housed within the fine adjustment knob 34'. Conical friction surface 26', coaxial with shaft 18' on hub 22', engages friction member 40' in the same manner as previously described.

Knob 24', fixed directly to shaft 18' has a recess therein in which spring 44' is inserted to bear directly against knob 24'—the opposite end of spring 44' bears against thrust bearing 46' which is placed in a recess formed in fine adjustment knob 34'.

Bushing 50′ is inserted between shaft 18′ and base 16′ to insure a close running fit.

In operation, for coarse adjustment an axial force sufficient to overcome the resisting force of spring 44 is applied to knob 24 to urge the knob towards base 16. Upon the axial movement of knob 24 towards the base, surface 26 moves away from surface 42 rendering the fine adjusting mechanism inoperative with respect to hub 22 and shaft 18. In this condition, knob 24 may be turned in either direction resulting in a direct or coarse positioning of rack 10 through the rotation of shaft 18 and pinion gear 20.

When the axial force on knob 24 is withdrawn, the force of spring 44 will urge the coarse adjusting knob 24 and hub 22 away from base 16 so that surface 26 will engage surface 42 rendering the fine adjusting mechanism operative. As fine adjusting knob 34 is turned, gears 30 are carried about sun gear 28 with friction members 40 having like rotation and simultaneous co-action, through surfaces 42 and 26, with the hub 22. The diameters of the respective elements are such that a reduced rotation of shaft 18 is obtained which results in a fine positioning of rack 10.

The positioning device also acts as a positive brake for worktable 4 in all positions, and all conditions except when the coarse adjustment is operative to disengage the clutch elements. The brake action results as spring 44 urges conical friction surface 26 into engagement with surface 42. Because of the extreme reduction in rotation between knob 34 and pinion 20, this ratio, viewed in the reverse sense, combined with the frictional engagement of planet gears 30 and sun gear 28 form in effect a positive continuously operative brake for worktable 4. This braking action is effective only in one direction, allowing free positioning through rotation of the adjustment knobs but preventing movement of the worktable through forces applied to it, and is effective all times with knob 24 in its outer position.

Thus it is seen that a multiple speed positioning device is provided which is compact in construction, simple in operation, and provides a high degree of precision movement during the fine adjustment operation. The fine adjustment components are housed in the fine adjustment knob and are always in engagement with the shaft driving means for fine positioning or braking action except when an axial force is applied to the coarse knob to disengage the clutching components and render the coarse adjusting means operative.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. A coaxial coarse and fine positioning device comprising,
   a base,
   a single drive shaft extending through said base,
   means attached to one end of said shaft to engage and position an element relative to said base upon rotation of said shaft,
   coarse adjustment means attached to said drive shaft for direct rotation of said shaft,
   fine adjustment means for imparting a fine rotation to said drive shaft and thereby a fine relative positioning between said base and element including reduction drive means comprising,
      a sun gear,
      planetary gearing,
      and friction elements for relative engagement and and co-action through said shaft,
   said fine adjustment means providing a braking action against rotation of said shaft through a motive force applied at said one end thereof,
   movement of said coarse adjustment means axially toward said base serving to disconnect said friction elements and render said coarse adjustment means operative for coarse adjustment,
   and means for yieldably urging said coarse adjustment means away from said base for rendering said coarse adjustment means inoperative and engaging said friction elements to render said fine adjustment means operative.

2. A coaxial coarse and fine positioning device comprising,
   a base,
   a single drive shaft extending through said base,
   means attached to one end of said shaft to engage and position an element relative to said base upon rotation of said shaft,
   a coarse adjustment knob attached to said drive shaft for direct rotation of said shaft,
   a friction surface fixed to said shaft coaxial therewith,
   fine adjustment means comprising,
      a fine adjustment knob coaxial with said coarse adjustment knob,
      a sun gear fixed to said base coaxial with said drive shaft,
      planetary gears engaging said sun gear and carried by the fine adjustment knob,
      friction members coaxially fixed for rotation with each of said planetary gears,
      said friction surface and friction members being engageable and disengageable upon axial movement of said coarse adjustment knob,
      the effective diameter of said friction surface relative to said sun gear providing major drive shaft reduction and rotation in the same direction with rotation of said fine adjustment knob,
   said fine adjustment means providing a braking action against rotation of said shaft through a motive force applied at said one end thereof,
   movement of said coarse adjustment knob axially toward said base serving to disconnect said friction surface from said friction members and render said coarse adjustment knob operative for coarse adjustment,
   and means yieldably urging said coarse adjustment knob away from said base for rendering said coarse adjustment knob inoperative and engaging said friction components to render said fine adjustment means operative.

3. A coaxial coarse and fine positioning device as in claim 2 wherein, said friction surface and the surfaces of said friction members are similarly inclined relative to the axis of said shaft to allow disengagement of said surfaces upon movement of said coarse adjustment knob axially towards the base.

4. A coaxial coarse and fine positioning device as in claim 2 wherein the effective diameter of said friction surface is less than that of said sun gear to permit shaft reduction upon engagement of and rotation of the fine adjustment means.

5. A coaxial coarse and fine positioning device comprising,
   a base,
   a drive shaft extending through said base,
   means attached to one end of said shaft to engage and position an element relative to said base upon rotation of said shaft,
   a course adjustment knob fixably attached to the other end of said drive shaft,
   a friction surface fixed to said shaft coaxial therewith,
   fine adjustment means for importing a fine rotation to said drive shaft through said friction surface comprising,
      a sun gear fixed to said base coaxial with said drive shaft,
      planet gears meshing with said sun gear, a friction member coaxially connected for rotation with each of said planet gears, the opposing surfaces of said friction surface and friction members being similarly inclined relative to the axis of said shaft to allow simultaneous engagement and disengagement of said surfaces upon axial movement of said coarse adjustment knob, said fine adjustment means providing a braking action against rotation of said shaft through a motive force applied at said one end thereof, an annular fine adjustment knob covering the fine adjustment means extending axially from said base to adjacent said coarse adjustment knob, whereby the operating components of the device are compactly housed by said knobs, said fine adjustment knob carrying said planet gears for rotation about said sun gear whereby said friction surface is driven through engagement of said friction members therewith, the effective diameter of the coarse adjustment knob friction surface relative to said sun gear providing drive shaft reduction and rotation in the same direction with rotation of said fine adjustment knob, movement of said coarse adjustment knob axially toward said base serving to disconnect said friction surface from said friction member and render said coarse adjustment knob operative for coarse adjustment through direct rotation of said shaft, and means yieldably urging said coarse adjustment knob away from said base for rendering said coarse adjustment knob inoperative for coarse adjustment and engaging said friction components to render said fine adjustment means operative.

References Cited

UNITED STATES PATENTS

| | | | | |
|---|---|---|---|---|
| 1,622,783 | 3/1927 | Heyman | | 74—10.54 |
| 1,632,352 | 6/1927 | Stewart | | 74—10.5 |
| 1,634,676 | 7/1927 | Meyer | | 74—10.5 |
| 2,803,966 | 8/1957 | Morris | | 74—10.52 |

MILTON KAUFMAN, *Primary Examiner.*